United States Patent [19]

Tenten et al.

[11] Patent Number: 5,512,525

[45] Date of Patent: Apr. 30, 1996

[54] REGENERATION OF SPENT MULTIMETAL OXIDE OXIDATION CATALYSTS FROM THE CATALYTIC GAS-PHASE OXIDATION OF LOWER ORGANIC COMPOUNDS

[75] Inventors: Andreas Tenten, Neustadt; Ulrich Hammon; Peter Weidlich, both of Mannheim; Walter Doerflinger, Oestringen, all of Germany

[73] Assignee: BASF Aktiengesellschaft, Ludwigshafen, Germany

[21] Appl. No.: 189,734

[22] Filed: Feb. 1, 1994

[30] Foreign Application Priority Data

Feb. 3, 1993 [DE] Germany .......................... 43 02 992.2

[51] Int. Cl.⁶ ...................................... B01J 20/34
[52] U.S. Cl. .................... 502/26; 502/28; 502/38
[58] Field of Search ...................... 502/26, 27, 28, 502/38

[56] References Cited

U.S. PATENT DOCUMENTS

| | | | |
|---|---|---|---|
| 4,111,832 | 9/1978 | Rohbock et al. | 502/26 |
| 4,165,296 | 8/1979 | Ishii et al. | 502/26 |
| 4,190,553 | 2/1980 | Ward | 208/111 |
| 4,425,255 | 1/1984 | Toyoda et al. | |
| 4,529,714 | 7/1985 | Mross et al. | 502/26 |
| 4,814,305 | 3/1989 | Kamogawa et al. | 502/29 |
| 4,861,938 | 8/1989 | Lewis et al. | 502/38 |
| 5,324,695 | 6/1994 | Karrer et al. | 502/27 |

FOREIGN PATENT DOCUMENTS

| | | |
|---|---|---|
| 0017000 | 10/1980 | European Pat. Off. . |
| 0311334 | 4/1989 | European Pat. Off. . |
| 3151805 | 7/1983 | Germany . |

*Primary Examiner*—Anthony McFarlane
*Attorney, Agent, or Firm*—Oblon, Spivak, McClelland, Maier & Neustadt

[57] ABSTRACT

A process for regenerating spent multimetal oxide oxidation catalysts from the catalytic gas-phase oxidation of lower organic compounds and which, in fresh form, contain as basic constituents the elements Mo, W, V and Cu in oxidic form, by the action of oxidizing agents or means and solubilizing, aqueous ammonia to which acetic acid and/or the ammonium salt thereof has been added, with subsequent drying and calcination, comprises quantitatively determining the content of metallic constituents during the process and making this content up to the respective original value.

2 Claims, No Drawings

REGENERATION OF SPENT MULTIMETAL OXIDE OXIDATION CATALYSTS FROM THE CATALYTIC GAS-PHASE OXIDATION OF LOWER ORGANIC COMPOUNDS

The present invention relates to a process for regenerating spent multimetal oxide oxidation catalysts from the catalytic gas-phase oxidation of lower organic compounds and which, in fresh form, contain as basic constituents the elements Mo, W, V and Cu in oxidic form, by the action of oxidizing agents or means and solubilizing, aqueous ammonia to which acetic acid and/or the ammonium salt thereof has been added, with subsequent drying and calcination.

Multimetal oxide oxidation catalysts which, in fresh form, contain as basic constituents the elements Mo, W, V and Cu in oxidic form and are used for the catalytic gas-phase oxidation of lower organic compounds, such as $C_3$–$C_6$-alkanes, alkanols, alkanals, alkenes and alkenals to olefinically unsaturated aldehydes and/or carboxylic acids, or the corresponding nitriles (ammonoxidation) are generally known (cf. for example, EP-A 427 508, DE-A 29 09 671, DE-C 31 51 805, EP-A 235 760 and DE-B 26 26 887). They are particularly advantageously employed in the catalytic gas-phase oxidation of acrolein to acrylic acid.

These catalytic gas-phase oxidations are all exothermic fixed-bed reactions which are carried out at elevated temperature (a few 100° C.). In the case of the oxidation of acrolein to acrylic acid, the reaction temperatures are generally in the range from 200° to 400° C.

These multimetal oxide oxidation catalysts are normally prepared by producing a very intimate dry mix of suitable starting compounds containing the elemental catalyst constituents and calcining this mixture at from 200° to 500° C., preferably at from 300° to 400° C.

The only essential feature is that the starting compounds employed are either already oxides or are compounds which can be converted into oxides by heating, if necessary in the presence of oxygen. In addition to the metal oxides, suitable starting compounds are therefore, in particular, halides, nitrates, formates, acetates, carbonates or hydroxides. Suitable starting compounds of Mo, W and V are also their oxo compounds (molybdates, tungstates and vanadates) and the acids derived therefrom.

The intimate mixing of the starting compounds can be carried out in dry or wet form. If it is carried out in dry form, the starting compounds are expediently employed as finely divided powders and after the mixing are pressed (for example tableted), for example to give catalyst bodies of the desired geometry, which are then subjected to the calcination.

However, the intimate mixing is preferably carried out in wet form. In this case, the starting compounds are usually mixed with one another in the form of an aqueous solution or suspension. The aqueous composition is then dried and calcined. The drying process is preferably carried out immediately after preparation of the aqueous mixture and is accomplished by spray drying (the starting temperatures are generally from 100° to 150° C.). The powder thus produced can be shaped directly by pressing. Frequently, however, it proves to be too finely divided for direct further processing; it is therefore expediently first headed with addition of water.

The kneading composition produced is subsequently either shaped to the desired catalyst geometry, dried and then calcined (gives unsupported catalysts) or calcined without shaping and then ground to give a finely divided powder (usually<80 μm), which, normally with addition of a small amount of water and, if desired, further conventional binders, is applied as a moist composition to an inert support. Completion of the coating operation is followed by further drying, giving the ready-for-use shell catalyst. In principle, however, the calcined powder can also be employed as a powder catalyst. If the starting compounds are mixed in the form of an aqueous solution, inert porous supports can also be impregnated therewith, dried and subsequently calcined to give supported catalysts.

In the preparation of shell catalysts, the coating of the supports can also be carried out before the calcination, ie., for example, with the moistened wettable powder. Examples of support materials which are suitable for shell catalysts are porous or unporous aluminum oxides, silicon dioxide, thorium dioxide, zirconiumdioxide, silicon carbide or silicates, such as magnesium silicate or aluminum silicate. The supports may have a regular or irregular shape; regular supports with a distinct surface roughness, for example beads or hollow cylinders, are preferred. Of these, beads are in turn advantageous.

Very particularly advantageous is the use of essentially unporous, surface-rough, spherical supports make from steatite, whose diameter is from 1 to 6 mm, preferably from 4 to 5 mm. The coating thickness of the active composition is expediently selected in the range from 50 to 500 μm, preferably in the range from 150 to 250 μm.

The calcination of the dry composition containing the starting compounds in an intimate mixture is advantageously carried out in a rotary kiln charged with air.

The oxygen required during gas-phase oxidations can be supplied, for example, in the form of air, but also in pure form. Due to the high heat of reaction, the reactants are preferably diluted with inert gas, such as $N_2$, recycled reaction offgases and/or steam. The oxidation of acrolein is usually carried out at an acrolein:oxygen:steam:inert gas ratio by volume of from 1:(1 to 3):(0 to 20):(3 to 30), preferably from 1:(1 to 3):(0.5 to 10):(7 to 18). The process is normally carried out using acrolein prepared by catalytic gas-phase oxidation of propens. In general, the acrolein-containing reaction gases from this propens oxidation are employed without interim purification. The reaction pressure is usually from 1 to 3 bar, and the overall space velocity is preferably from 1000 to 3500 l(s.t.p.)/l/h. Typical multitube fixed-bed reactors are described, for example, in DE-A 28 30 765, DE-A 22 01 528 and U.S. Pat. No. 3,147,084.

It is known that although multimetal oxide compositions of the type described can be employed for a number of years for said application under the stated boundary conditions, they ultimately decrease little by little in activity due to damage. Due to the large amounts used and the attendant metal raw material costs, there is considerable interest in regenerative work-up of the spent multimetal oxide oxidation catalysts. DE-C 31 51 805 discloses the regeneration of spent multimetal oxide oxidation catalysts from the catalytic gas-phase oxidation of lower organic compounds and which, in fresh form, contain as basic constituents the elements Mo, W, V and Cu in oxidic form, by the action of oxidizing hydrogen peroxide and solubilizing aqueous ammonia to which acetic acid and/or the ammonium salt thereof has been added, with subsequent drying and calcination.

However, the activity of the multimetal oxide oxidation catalysts regenerated in this way is not completely satisfactory.

It is an object of the present invention to provide an improved process for regenerating spent multimetal oxide oxidation catalysts from the catalytic gas-phase oxidation of lower organic compounds (in particular of acrolein to acrylic acid) and which, in fresh form, contain as basic constituents the elements Mo, W, V and Cu in oxidic form.

We have found that this object is achieved by a process for regenerating spent multimetal oxide oxidation catalysts from the catalytic gas-phase oxidation of lower organic compounds and which, in fresh form, contain as basic constituents the elements Mo, W, V and Cu in oxidic form, by the action of oxidizing agents or means and solubilizing, aqueous ammonia to which acetic acid and/or the ammoniumsalt thereof has been added, with subsequent drying and calcination, which comprises quantitatively determining the content of metallic constituents during the process and making this content up to the respective original value.

The oxidizing means used for the spent multimetal oxide oxidation catalysts can be, for example, a simple roasting process, ie. the spent multimetal oxide oxidation catalysts are heated for several hours at from 400° to 650° C. in the presence of oxygen, for example in the form of air. The process can generally be terminated when evolution of gas from the catalyst bodies is no longer observed. This oxidative treatment, which can be carried out in a simple manner in a fan-assisted oven charged with air, presumably removes accumulated carbon-containing compounds from the surface of the multimetal oxide oxidation catalysts and converts metallic constituents in reduced formback into an oxidized state.

The spent mixed oxides roasted in this way can then be treated with an aqueous ammonia solution. The concentration of the ammonia is expediently in the range from 5 to 25% by weight. This treatment causes the acidic oxides to dissolve, which means that all the mixed oxide is converted into an aqueous solution or aqueous suspension. It can be carried out in a broad temperature range, generally at from 10° to 100° C., preferably at from 60° to 90° C. and particularly preferably from 70° to 80° C. It should be carried out until the pH of the solution no longer changes, even after additional further fresh aqueous $NH_3$ solution. Otherwise the soluble catalytically active metal oxide components have not dissolved fully, which reduces the regeneration. The dissolution treatment can be carried out, for example, by extracting the spent catalysts on filters with the aqueous ammonia solution. However, these spent catalysts can also be treated with the aqueous ammonia solution, if desired a number of times with fresh aqueous ammonia solution, in a stirred vessel. Repeated treatment with the aqueous ammonia solution is particularly advisable if the active catalyst constituents adhere strongly to support materials or are held in pores of support materials, as can occur in the case of shell catalysts or in the case of supported catalysts prepared by impregnation. In the case of support-containing catalysts, the solution or suspension which forms during the treatment is separated from the support, preferably by, for example, decanting or filtration.

However, the dissolution treatment can also be carried out without the prior roasting process. In this case, the oxidizing agent added to the aqueous ammonia solution is advantageously hydrogen peroxide. Typical $H_2O_2$ contents are from 0.01 to 0.5 g, in particular from 0.02 to 0.2 g per g of mixed oxide (higher $H_2O_2$ amounts prove not to be particularly crucial, but are not expedient). The amount of ammonia is typically greater than 0.1 g, preferably greater than 1 g, per g of mixed oxide. If desired, a roasting process can also be combined with an $H_2O_2$ treatment of this type.

Analysis of the resultant aqueous mixture, for example by means of atom absorption spectroscopy (AAS), shows, surprisingly, that clearly Mo and V in particular, volatilize (are lost and are discharged) to a considerable extent during the catalytic fixed-bed oxidation (in particular of acrolein to acrylic acid). The deficits observed analytically with respect to various catalyst constituents are eliminated by adding suitable starting compounds which contain these constituents. Expediently, but not necessarily, the same starting compounds are employed for this purpose as for the fresh preparation of the multimetal oxide oxidation catalysts. Before a dry mix containing the elemental catalyst constituents in an intimate mixture is prepared from the aqueous mixture in a manner known per se (preferably by spray drying), from 0.1 to 1 g of ammonium acetate or acetic acid, which is capable of forming same is added, based on 3 g of active composition present in the aqueous mixture (addition of larger amounts of ammonium acetate does not prove to be essentially crucial, but is not expedient).

It is of course also possible for the acetic acid or ammonium acetate to have already been added before the dissolution treatment. If desired, the resultant aqueous solution or suspension or the dry mix to be produced therefrom can now be used, to produce, in a manner known from the fresh preparation of the multimetal oxide oxidation catalysts, supported, unsupported or shell catalysts, which can be used for the catalytic gas-phase oxidation of lower organic compounds.

The process according to the invention is particularly suitable for regenerating spent multimetal oxide oxidation catalysts which, freshly prepared, conform to the empirical formula I $$Mo_{12}V_aW_bCu_cNi_dX_e^1X_f^2X_g^3X_h^4X_i^5O_n \qquad (I),$$

where
$X^1$ is one or more alkali metals,
$X^2$ is one or more alkaline earth metals,
$X^3$ is chromium, manganese, cerium and/or niobium,
$X^4$ is antimony and/or bismuth,
$X^5$ is silicon, aluminum, titanium and/or zirconium,
a is from 1 to 6,
b is from 0.2 to 4,
c is from 0.5 to 6,
d is from 0 to 6,
e is from 0 to 2,
f is from 0 to 3,
g is from 0 to 5,
h is from 0 to 40,
i from 0 to 40 and
n is a number which is determined by the valency and frequency of the elements in I other than oxygen. In the case of unsupported catalysts, i is preferably from 15 to 40. The process according to the invention has proven very particularly favorable for compositions I in which e, f, g, h and i are 0 and which are used in the form of shell catalysts.

EXAMPLES a) The preparation of a multimetal oxide oxidation catalyst a: 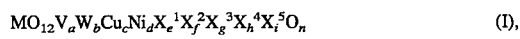

190 g of copper (II) acetate monohydrate were dissolved in 2700 g of water to give a solution I. 860 g of ammoniumheptamolybdate tetrahydrate, 143 g of ammonium metavanadate and 126 g of ammonium paratungstate heptahydrate were dissolved one after the other in 5500 g of water at 95° C. to give a solution II. Solution I was subsequently stirred in one portion into solution II, and the aqueous mixture was spray-dried at an outlet temperature of 110° C. The wettable powder was then compounded with 0.15 kg of water per kg of powder. The composition was heated to 400° C. over the course of 3 hours in an air-charged rotary kiln and subsequently calcined at 400° C. for 5 hours. The calcined, catalytically active material was ground to a particle diameter of from 0.1 to 50 μm. The resultant active composition powder was coated in a rotary drum onto unporous, surface-rough steatite beads having a diameter of from 4 to 5 mm in an amount of 50 g of powder per 200 g of steatite beads, with simultaneous addition of 18 g of water. The coating was subsequently dried by means of air at 110° C.

The resultant shell catalyst, diluted with inert material, was employed under the following reaction conditions in a tube-bundle reactor for the catalytic gas-phase oxidation of acrolein to acrylic acid:

Composition of the reaction gas: 5% by volume of acrolein, 7% by volume of $O_2$, 10% by volume of $H_2O$, remainder $N_2$;

Space velocity: 2300 1 (s.t.p.)/l/h.

The temperature of the salt bath used for temperature control was selected so that an acrolein conversion of about 99 mol % resulted from a single pass.

Table 1 shows the necessary salt-bath temperature (measure of the activity; the higher the necessary salt-bath temperature, the lower the catalyst activity) and the selectivity of the acrylic acid formation after an operating time of 4 weeks (a1) and after an operating time of three years (a2).

b) Regeneration according to the invention of the multimetal oxide oxidation catalyst a used for 3 years under the reaction conditions from a).

First, the shell catalysts were heated at 550° C. for 2.5 hours in an air-charged fan-assisted oven. 900 g of the roasted shell catalyst were introduced into a scrubber and treated cyclically for 2 hours with a solution, heated to 80° C., of 58 g of $NH_3$, 1700 g of water and 24 g of 30% strength by weight of hydrogen peroxide solution. After this time, all the active composition had dissolved, and was separated from the support beads after cooling. The support beads were then washed with 200 g of water at 75° C. The two aqueous phases were then combined and analyzed quantitatively by means of AAS. As a consequence of the reduction in the amount of Mo and V, the active composition stoichiometry had changed as follows: $Mo_{7.5}V_{2.6}W_{1.2}Cu_{2.4}O_x$.

In order to restore the original stoichiometry, the following solutions were prepared and added to the combined phases:

an 80° C. solution of 54.8 g of ammonium heptamolybdate tetrahydrate and 70 g of 25% strength by weight aqueous $NH_3$ solution in 110 g of water;

an 80° C. solution of 3.2 g of ammonium metavanadate and 6.5 g of 25% strength by weight aqueous $NH_3$ solution in 65 g of water.

10 g of 100% acetic acid were added to the combined solutions, and the mixture was spray-dried at an outlet temperature of 110° C. The wettable powder was converted into a regenerated shell catalyst entirely analogously to the fresh preparation under a) (the steatite support beads were re-used in this respect after separation) and employed as under a) for the oxidation of acrolein. The results after an operating time of four weeks are also shown in Table 1 (a3).

c) Regeneration of the multimetal oxide oxidation catalyst a used for 3 years under the reaction conditions from a) without compensation for the loss of Mo and V.

The regeneration was carried out as under b), but the Mo and V deficit observed was left. The results after an operating time of four weeks with the shell catalysts regenerated in this way are likewise shown in Table 1 (a4).

TABLE 1

| Shell catalyst | Acrolein conversion [mol %] | Salt-bath temperature [°C.] | Selectivity [mol %] |
|---|---|---|---|
| a1 | 99 | 265 | 95 |
| a2 | 99 | 290 | 93.5 |
| a3 | 99 | 263 | 95 |
| a4 | 99 | 287 | 93.5 | d) Fresh preparation of a multimetal oxide oxidation catalyst b: $Mo_{12}V_3W_{1.2}Cu_{1.6}Ni_{0.8}O_x$ The preparation of the multimetal oxide oxidation catalyst b was carried out as in a), merely with the proportionate amount of copper (II) acetate monohydrate replaced by nickel (II) acetate tetrahydrate.

Use for the oxidation of acrolein was again carried out as under a). The results after an operating time of four weeks (b1) and three years (b2) are shown in Table 2.

e) Regeneration according to the invention of the multimetal oxide oxidation catalyst b used for 3 years under the reaction conditions from a).

The catalyst was first roasted as in b). 900 g of the roasted shell catalyst were introduced into a scrubber and treated cyclically for 3 hours with a solution, heated to 70° C., of 55 g of $NH_3$ in 1800 g of water. After this time, all the active composition had dissolved, and was separated from the support beads after cooling. The support beads were subsequently washed with 200 g of water at 75° C. The two aqueous phases were then combined and analyzed quantitatively by means of AAS. As a consequence of the reduction in the amount of Mo and V, the active composition stoichiometry had changed as follows: $Mo_{8.4}V_{2.7}W_{1.2}Cu_{1.6}Ni_{0.8}O_x$.

In order to restore the original stoichiometry, the following solutions were prepared and added to the combined phases:

an 80° C. solution of 43.8 g of ammonium heptamolybdate tetrahydrate and 57 g of 25% strength by weight of aqueous $NH_3$ solution in 90 g of water;

an 80° C. solution of ammonium metavanadate and 4.5 g of 25% strength by weight of aqueous $NH_3$ solution in 45 g of water.

30 g of 100% acetic acid were added to the combined solutions, and the mixture was spray-dried at an outlet temperature of 110° C. The wettable powder was converted into a regenerated shell catalyst entirely analogously to the fresh preparation under a) and was employed as under a) for the oxidation of acrolein. The results after an operating time of four weeks are also shown in Table 2 (b3).

TABLE 2

| Shell catalyst | Acrolein conversion [mol %] | Salt-bath temperature [°C.] | Selectivity [mol %] |
|---|---|---|---|
| b1 | 98 | 262 | 95 |
| b2 | 98 | 280 | 94 |
| b3 | 98 | 258 | 95 |

We claim:

1. In a process for regenerating a spent multimetal oxide oxidation catalyst from the catalytic gas-phase oxidation of lower organic compounds in which the catalyst contains as basic constituents the elements Mo, W, V and Cu in oxide form and initially contains said elements in a particular stoichiometric relationship, defined by empirical formula I $$Mo_{12}V_aW_bCu_cNi_dX_e^1X_f^2X_g^3X_h^4X_i^5O_n \qquad (I),$$

where
- $X^1$ is one or more alkali metals,
- $X^2$ is one or more alkaline earth metals,
- $X^3$ is chromium, manganese, cerium and/or niobium,
- $X^4$ is antimony, and/or bismuth,
- $X^5$ is silicon, aluminum, titanium, and/or zirconium,
- a is from 1 to 6,
- b is from 0,2 to 4,
- c is from 0.5 to 6,
- d is from 0 to 6,
- e is from 0 to 2,
- f is from 0 to 3,
- g is from 0 to 5,
- h is from 0 to 40,
- i is from 0 to 40 and
- n is a number which is determined by the valency and frequency of the elements in I other than oxygen, which comprises oxidizing the spent catalyst, solubilizing in an aqueous ammonia solution to which acetic acid and/or the ammonium salt thereof has been added, followed by drying and calcination, the improvement which comprises analyzing the contents of said elements to determine the presence of any element in less than the original stoichiometric amounts, and replenishing said catalyst with the element or elements found to be present in less than the original stoichiometric amounts in amounts sufficient to restore the original stoichiometric relationship.

2. A process as claimed in claim 1, wherein the catalytic gas-phase oxidation is that of acrolein to acrylic acid.

* * * * *